(12) United States Patent
Chang et al.

(10) Patent No.: US 8,792,749 B2
(45) Date of Patent: Jul. 29, 2014

(54) SCALING DEVICE AND METHOD CAPABLE OF CONTROLLING DATA FLOW QUANTITY

(75) Inventors: Chia-Pei Chang, Taipei (TW); Hsin-Ying Ou, Kaohsiung (TW); Hui-Huang Chang, Cyonglin Township, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 3161 days.

(21) Appl. No.: 10/942,183

(22) Filed: Sep. 16, 2004

(65) Prior Publication Data

US 2005/0058370 A1  Mar. 17, 2005

(30) Foreign Application Priority Data

Sep. 16, 2003  (TW) ................................ 92125418 A

(51) Int. Cl.
  *G06K 9/32* (2006.01)
  *G06T 3/40* (2006.01)
(52) U.S. Cl.
  CPC ........... *G06T 3/4084* (2013.01); *G06T 2200/28* (2013.01)
  USPC ............. 382/298; 345/545; 345/668; 355/40; 370/357; 382/169; 382/250; 382/299; 712/42
(58) Field of Classification Search
  USPC ......................................................... 382/298
  See application file for complete search history.

(56) References Cited

U.S. PATENT DOCUMENTS

| | | | | |
|---|---|---|---|---|
| 4,069,511 A | * | 1/1978 | Lelke | 345/545 |
| 4,075,695 A | * | 2/1978 | Lelke | 712/42 |
| 4,528,693 A | * | 7/1985 | Pearson et al. | 382/299 |
| 4,872,064 A | * | 10/1989 | Tutt et al. | 382/298 |
| 5,020,115 A | * | 5/1991 | Black | 382/298 |
| 5,339,368 A | * | 8/1994 | Higgins-Luthman et al. | 382/169 |
| 5,740,284 A | * | 4/1998 | Wober et al. | 382/250 |
| 5,901,274 A | | 5/1999 | Oh | |
| 5,952,994 A | * | 9/1999 | Ong et al. | 345/668 |
| 5,999,646 A | * | 12/1999 | Tamagaki | 382/169 |
| 6,002,809 A | * | 12/1999 | Feig et al. | 382/298 |
| 6,323,934 B1 | * | 11/2001 | Enomoto | 355/40 |
| 2002/0064154 A1 | * | 5/2002 | Sharma et al. | 370/357 |

FOREIGN PATENT DOCUMENTS

| | | |
|---|---|---|
| JP | 04337877 | 11/1992 |
| JP | 09114443 | 5/1997 |
| JP | 11095974 | 4/1999 |

* cited by examiner

*Primary Examiner* — Tsung-Yin Tsai

(74) *Attorney, Agent, or Firm* — McClure, Qualey & Rodack, LLP

(57) ABSTRACT

A scaling device for receiving and scaling a digital image signal includes a scaling module and a data quantity control logic. The scaling module scales the digital image signal and then outputs a scaled output signal according to a scaling ratio. The data quantity control logic controls output quantity of the scaled output signal according to a scaling ratio. Thus, when the data quantity outputted from the scaling module is controlled within the data quantity that may be processed by the post stage of the scaling module per unit time, the data quantities that may be processed per unit time in the post stage processing devices of the scaling module approximate a constant value such that the post stage processing speed of the scaling module may be increased.

16 Claims, 3 Drawing Sheets

SCALING DEVICE AND METHOD CAPABLE OF CONTROLLING DATA FLOW QUANTITY

This application claims the benefit of Taiwan application Serial No. 092125418, filed on Sep. 16, 2003, the subject matter of which is incorporated herein by reference.

BACKGROUND OF THE INVENTION

1. Field of the Invention

The invention relates in general to a scaling module and a scaling method, and more particularly to a scaling module and method capable of controlling data flow quantity.

2. Description of the Related Art

The typical digital image processing operations include scaling, color adjusting, halftone adjusting, filtering, and data formatting procedures converting for specific I/O apparatuses.

The digital image scaling procedure may greatly increase the data quantity of the scaled digital image. For example, when the digital image is regarded as the two-dimensional signal, the digital image scaling includes the first dimensional (horizontal) scaling followed by the second dimensional (vertical) scaling.

FIG. 1 is a schematic illustration showing the flow of scaling a digital image in one dimension using a conventional scaling module. In FIG. 1, a digital image signal X[n] representative of four pixels of the digital image 4 will be up-scaled by N/M (N equals 4 and M equals 3 in FIG. 1) times by the conventional scaling module 100 according to the interpolation method. After the digital image signal X[n] enters the conventional scaling module 100, the up-sampling device 110 in the scaling module 100 up-samples the digital image signal X[n] by four times. That is, (4-1) zeros are inserted between two pixels among the four pixels represented by the digital image signal X[n] in order to form the digital image signal $X_1[n]$.

The low-pass filter 120 filters the digital image signal $X_1[n]$ to obtain the signal $X_2[n]$ having 16 pixels. Finally, the down-sampling device 130 down-samples the digital image signal $X_2[n]$ by three times. That is, one pixel from every three pixels are taken from the 16 pixels of the digital image signal $X_2[n]$ so as to form the digital image signal Y[n] having five pixels. So, after the conventional scaling module 100 up-scales the digital image signal X[n] representative of four pixels by 4/3 times, the digital image signal Y[n] having five pixels will be produced.

The above-mentioned procedures only up-scale the digital image signal X[n] in the first-dimensional direction. After the up-scaling in the first-dimensional direction, the up-scaling in the second dimensional direction has to be performed. That is, after the digital image signal X[n] is up-scaled by the conventional scaling module 100, the data quantity contained in the digital image signal Y[n] will increase. If the up-scaling ratio of the scaling module 100 increases, the data quantity contained in the digital image signal Y[n] also increases accordingly.

After the conventional scaling module 100 up-scales the digital image signal X[n], the bulk data contained in the digital image signal has to be processed by some processing units (e.g., the color adjusting unit, halftone adjusting unit, filter unit and data formatting unit for specific I/O apparatus) in the post stage of the scaling module 100. The bulk data processing, however, cannot be completed by the post stage processing units of the scaling module 100 per unit time. Thus, an external memory 230 is needed when the post stage processing units of the conventional scaling module 100 are processing the bulk data.

FIG. 2 is a schematic illustration showing an image processing device including a conventional scaling module. Referring to FIG. 2, the digital image processing device 200 mainly includes a conventional scaling module 100 and some processing units 210 to 220 in its post stage. This architecture has the following drawbacks.

1. When the conventional scaling module 100 is up-scaling, the outputted and up-scaled data increases with an up-scaling ratio, and the subsequent processing units 210 to 220 cannot process the relative bulk data, which is up-scaled, per unit time. Therefore, the external memory 230 is needed to temporarily store the up-scaled data that is outputted from the conventional scaling module 100.

2. When the conventional scaling module 100 is down-scaling, the outputted and down-scaled data decreases with an down-scaling ratio, and the subsequent processing units 210 to 220 can only process the relative amount of down-scaled data per unit time. Thus, the maximum bandwidth cannot be completely used.

In view of this, the invention provides a scaling module and method capable of controlling data input quantity and/or output quantity, of reducing the requirement of the external memory, and of effectively increasing the scaling speed and subsequent processing speed of the digital image signal. Therefore, the efficiency in the processing procedure of the digital image signal can be increased.

SUMMARY OF THE INVENTION

It is therefore an object of the invention to provide a scaling device capable of controlling data flow quantity, i.e., input quantity and/or output quantity, in order to control the data quantity of the processed digital image signal.

The data quantity of the digital image signal that can be processed by the scaling device at a time depends on the data quantity that can be processed by the post stage processing units coupled to the scaling device per unit time, so that the efficiency of the post stage processing units of the scaling device can be optimized.

In a preferred embodiment of the invention, the scaling device includes a flow controlling device, which is a direct memory access device.

In the preferred embodiment of the invention, these processing units may include a serially-connected color processing device, a halftone processing device, a filtering device, and a data formatting device for formatting the specific I/O apparatus.

Because each post stage processing device of the scaling module of the invention can process the data outputted from the scaling module per unit time, only a buffer device is needed between the scaling module and each processing device, and no extra memory has to be used.

Another object of the invention is to provide a scaling method capable of controlling data flow quantity. According to the invention, the data quantity of the digital image signal that can be processed by the scaling module at a time is controlled such that the data quantity outputted form the scaling module after the digital signal is processed at a time is smaller than or equal to the data quantity that can be processed by the post stage of the scaling module per unit time.

In the preferred embodiment of the invention, the digital signal represents the pixels in an arbitrary number of rows of image signal.

In summary, the invention provides a scaling module and method using an arbitrary number of rows for input or output so as to effectively increase and optimize the processing speed of the digital image signal in the scaling and subsequent procedures.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
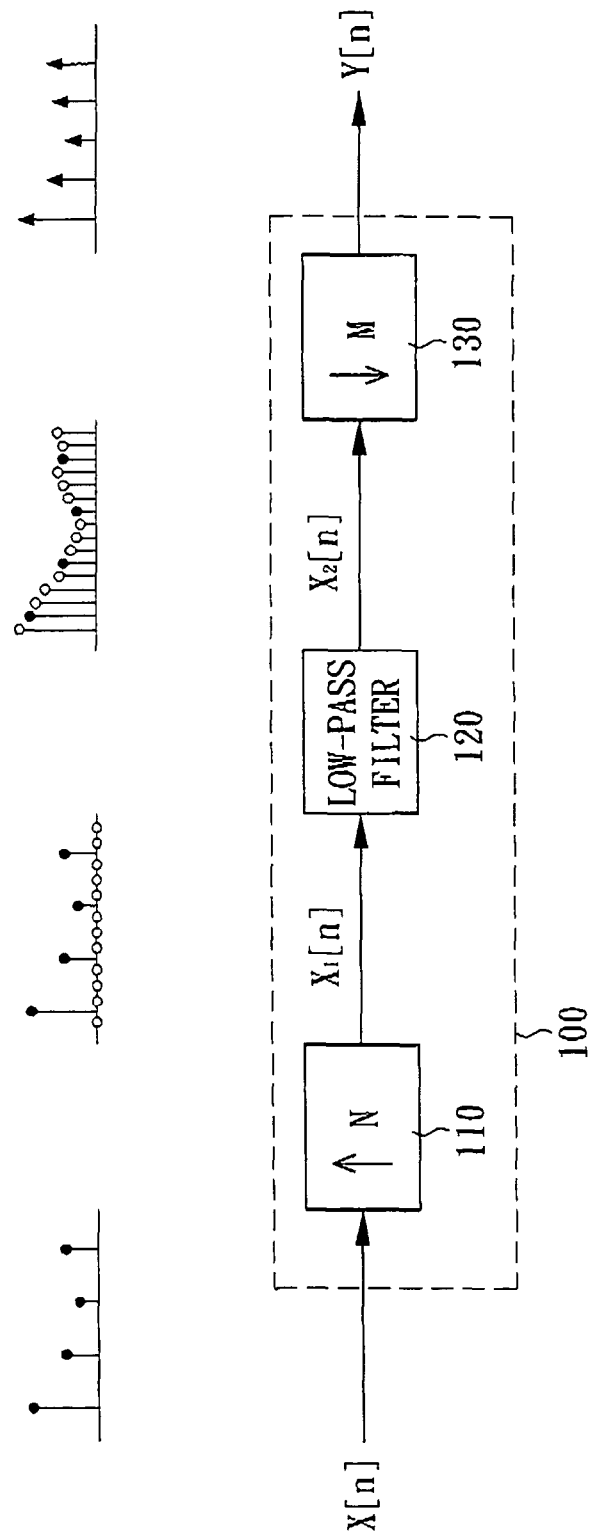
FIG. 1 is a schematic illustration showing the flow of scaling a digital image in one dimension using a conventional scaling module.
Figure 2:
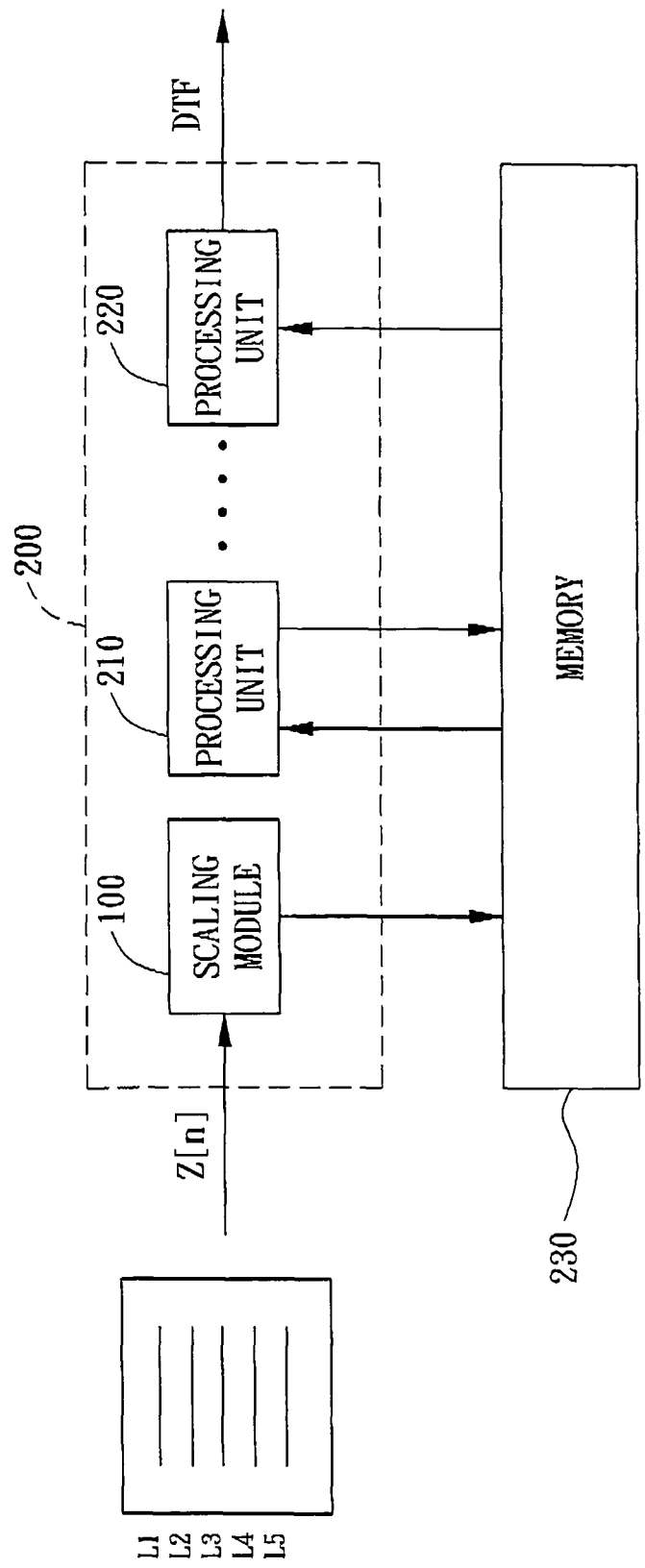
FIG. 2 is a schematic illustration showing an image processing device containing a conventional scaling module.
Figure 3:
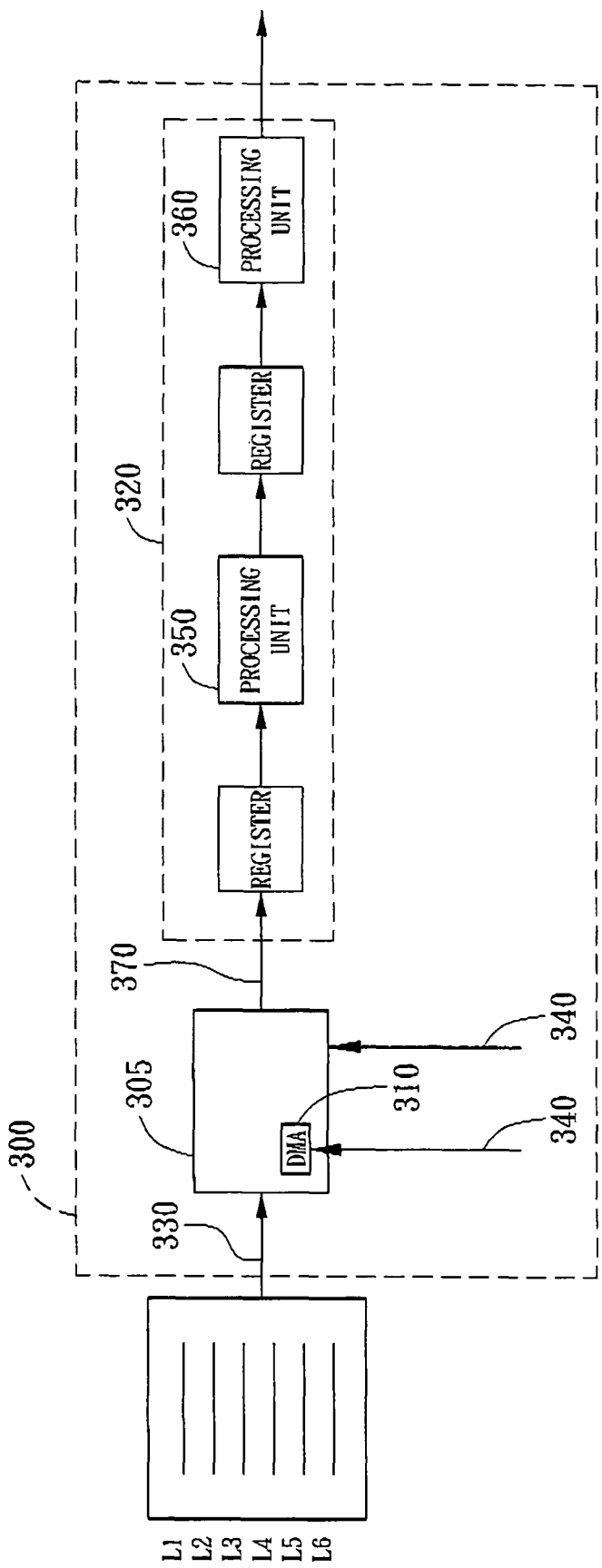
FIG. 3 is a schematic block diagram showing a scaling device, in which an arbitrary number of rows is inputted to or outputted from a scaling module according to the preferred embodiment of the invention.

In the preferred embodiment of the invention, the scaling module and method for the digital image processing device will be described. FIG. 3 is a schematic block diagram showing a scaling device, in which an arbitrary number of rows is inputted to or outputted from a scaling module according to the preferred embodiment of the invention. Referring to FIG. 3, the digital image processing device 300 includes a scaling module 305 and a processing device 320 coupled to the post stage of the scaling module 305.

The scaling module 305 further has a flow controlling device 310 such as a direct memory access (DMA) device. The flow controlling device 310 simultaneously receives a scaling ratio signal 340 for controlling the scaling module 305 to scale a digital image signal 330 in a scaling ratio so as to control the scaling module 305 to process the pixel data of the digital image signal 330 at a time.

For example, when the processing units 350 and 360 in the processing device 320 are designed to receive six rows of pixel data (L1 to L6) and the scaling ratio is 2, the flow controlling device 310 controls three rows of pixel data (e.g., L1 to L3) in the digital image signal 330 to be inputted to the scaling module 305. In this way, the data quantity of the scaling module output signal 370 is six rows of pixel data, which is just equal to the maximum data quantity that may be processed by the processing device 320 per unit time. If the scaling ratio is 3/4, the flow controlling device 310 controls the scaling module 305 to control eight pixels of data (e.g., L1 to L8) in the digital image signal 330 to be inputted to the scaling module 305, such that the data quantity of the scaling module output signal 370 is six rows of pixel data, which is just equal to the pixel data that can be processed by the processing device 320.

Therefore, when the data quantity of the digital image signal 330, which is processed at a time by the scaling module 305 controlled by the flow control unit 310, is equal to the maximum quantity per unit time of data which can be processed by the post stage processing device 320 with respect to the scaling module 305, the quantity per unit time of data processed by each of the processing units 350 and 360 in the processing device 320 will not exceed a loading limit, and the quantity per unit time of data that can be processed in each of the processing units 350 and 360 will be identical substantially.

Consequently, when the quantity per unit time of data processed by each of the processing units 350 and 360 in the digital image processing device 300 does not exceed the loading limit and is identical substantially, each of the processing units 350 and 360 saves a large amount of memory on temporarily storing the data that leads to overloading, and saves time on waiting for the overloading data that actually cannot be processed.

In one embodiment, the scaling module 305 includes a scaling speed control logic, according to which the scaling speed of the scaling module 305 may be controlled so as to control the output quantity of the scaling module 305, without departing from the spirit of the invention. In another embodiment, an apparatus for scaling a digital image signal includes a scaling module for scaling the digital image signal and then outputting a scaled output signal according to a scaling ratio; and a scaling speed control logic, coupled to the scaling module, for controlling a scaling speed of the scaling module according to a scaling ratio.

In addition, according to the actual operation, when the scaling module 305 uses the flow controlling device 310 to manage the overall time needed for the scaling module 305 to scale six rows of pixels L1 to L6 of the digital image signal 330, the overall time is shortened in a more effective manner as compared to the case when the flow controlling device 310 is not used for management.

Furthermore, a scaling method using an arbitrary number of rows for input or output is also provided according to the invention. In this scaling method, if the quantity of data outputted after the scaling module has processed a digital signal at a time is larger than the quantity per unit time of data, which can be processed by the post stage of the scaling module, the data quantity of the digital signal, which can be processed by the scaling module at a time, is controlled so that the data quantity of data outputted after the scaling module has processed the digital signal at a time is smaller than or equal to the quantity per unit time of data that can be processed by the post stage of the scaling module.

In other words, if the data quantity of the digital signal, which can be processed by the scaling module at a time, can be controlled, the output data quantity of the scaling module is controlled, thus enhancing the processing efficiently of the digital image system corresponding to the scaling module.

As illustrated in FIG. 3, the hardware and the flow controlling device 310 may be utilized to control the data quantity of the digital signal, which can be processed by the scaling module at a time. Thus, the invention has the following advantages.

First, since the data quantity to be scaled by the scaling module 305 of the invention at each time is controlled, the data quantity after the scaling of the scaling module 305 is also controlled simultaneously such that each of the post stage processing devices 350 and 360 of the scaling module 305 can process the data outputted from the scaling module 305 per unit time, and the data processing speeds of the post stage processing units 350 and 360 of the scaling module 305 per unit time are identical substantially. Thus, in the actual operation, the overall data processing speed of the post stage of the scaling module 305 becomes more efficient.

Secondly, since the data outputted from the scaling module 305 can be processed by the post stage processing units 350 and 360 of the scaling module 305, only the buffer memory (for example: FIFO or register) with a smaller storage capacity is needed between the post stage processing units 350 and 360 of the scaling module 305. Thus, an external memory with large storage capacity is unnecessary, thus reducing the cost of the digital signal processing system.

In summary, the invention provides a scaling module and method using an arbitrary number of rows for input or output. Controlling the data quantity of the digital signal that can be processed by the scaling module at a time can control the data quantity outputted from the scaling module. Thus, when the output data quantity of the scaling module is controlled to be equal or under the quantity per unit time of data that can be processed by the post stage of the scaling module, the quantity per unit time of data that can be processed by each of the post stage processing devices of the scaling module will be identical substantially, i.e. tending to a constant value. The post stage processing speed of the scaling module can thus be increased, and the digital processing system including the scaling module and the post stage of the scaling module has better efficiency.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for scaling a digital image signal comprising a plurality of data rows, the apparatus comprising:
    a scaling module for scaling the digital image signal and outputting a scaled output signal according to a scaling ratio;
    at least one image processing unit, coupled to the scaling module for receiving the scaled output signal and processing the scaled output signal to produce a processed image signal, wherein the at least one image processing unit has a maximum processing quantity per unit time; and
    a data quantity control logic, coupled to the scaling module for adjusting a number of the data rows in the digital image signal to be inputted to the scaling module according to the scaling ratio such that an output quantity of the scaled output signal per unit time of the scaling module is smaller than or equal to the maximum processing quantity per unit time of the at least one image processing unit.

2. The apparatus of claim 1, wherein the data quantity control logic adjusts the number of the data rows of the digital image signal inputted to the scaling module to optimize processing speeds of the scaling module and the at least one image processing unit.

3. The apparatus of claim 1, further comprising:
    a memory, which is coupled to the scaling module and the data quantity control logic, for outputting the digital image signal;
    wherein the data quantity control logic controls the memory to output the number of the data rows of the digital image signal to the scaling module based on the scaling ratio.

4. The apparatus of claim 3, wherein the data quantity control logic comprises a direct memory access logic (DMA Logic).

5. The apparatus of claim 1, wherein the data quantity control logic comprises a DMA Logic, and the DMA logic controls the number of the data rows of the digital image signal inputted to the scaling module based on the scaling ratio.

6. The apparatus of claim 1, wherein the at least one processing unit comprises a first image processing unit and a second image processing unit, and processing speeds of the first and the second image processing units are substantially the same.

7. The apparatus of claim 1, wherein the at least one processing unit is selected from a group of a color processing device, a halftone processing device, a filtering device, and a data format processing device.

8. The apparatus of claim 1, wherein the apparatus for scaling the digital image signal is used in a system without requirement of external memory which is used for storing the scaled output signal.

9. The apparatus of claim 1, wherein the data quantity control logic adjusts the number of the data rows of the digital image signal inputted to the scaling module such that the output quantity of the scaled output signal per unit time of the scaling module is maintained.

10. A method for scaling a digital image signal comprising a plurality of data rows, the method comprising:
    producing a control signal according to a scaling ratio;
    adjusting a number of the data rows in the digital image signal to be scaled based on the control signal;
    receiving the number of the data rows of the digital image signal, and scaling the number of the data rows of the digital image signal according to the scaling ratio to output a scaled output signal; and
    processing the scaled output signal by at least one processing unit to produce a processed image signal;
    wherein the number of the data rows in the digital image signal to be scaled is adjusted such that the output quantity per unit time of the scaled digital signal is not more than a processing quantity per unit time of the at least one processing unit.

11. The method of claim 10, wherein receiving the number of the data rows of the digital image signal is made by way of direct accessing.

12. The method of claim 10, wherein the step of processing the scaled output signal comprises first and second image processing procedures, wherein processing speeds of the first and the second image processing procedures are substantially the same.

13. The method of claim 10, wherein the method is used in a system without requirement of external memory which is used for storing the scaled output signal.

14. An apparatus for scaling a digital image signal comprising a plurality of data rows, the apparatus comprising:
    a first circuit for outputting the data rows of the digital image signal;
    a scaling module, coupled to the first circuit for scaling the data rows of the digital image signal and outputting a scaled output signal according to a scaling ratio;
    at least one image processing unit, coupled to the scaling module for receiving the scaled output signal and processing the scaled output signal to produce a processed image signal;
    a data quantity control logic, coupled to the scaling module for adjusting a number of the data rows in the digital image signal to be scaled according to the scaling ratio such that the output quantity per unit time of the scaled digital signal is not more than a processing quantity per unit time of the at least one processing unit 15. The apparatus of claim 14, wherein the apparatus for scaling a digital image signal is used in a system without requirement of external memory which is used for storing the scaled output signal.

16. The apparatus of claim 14, wherein the first circuit comprises a memory and the data quantity control logic comprises a direct memory access logic for d6irect accessing the memory.

* * * * *